(12) United States Patent
Huai et al.

(10) Patent No.: US 6,714,444 B2
(45) Date of Patent: Mar. 30, 2004

(54) MAGNETIC ELEMENT UTILIZING SPIN TRANSFER AND AN MRAM DEVICE USING THE MAGNETIC ELEMENT

(75) Inventors: Yiming Huai, Pleasanton, CA (US); Paul P. Nguyen, San Jose, CA (US)

(73) Assignee: Grandis, Inc., Milpitas, CA (US)

( * ) Notice: Subject to any disclaimer, the term of this patent is extended or adjusted under 35 U.S.C. 154(b) by 0 days.

(21) Appl. No.: 10/213,537

(22) Filed: Aug. 6, 2002

(65) Prior Publication Data

US 2004/0027853 A1 Feb. 12, 2004

(51) Int. Cl.⁷ .............................................. G11C 11/14
(52) U.S. Cl. ........................ 365/171; 365/173; 365/158
(58) Field of Search ................................. 365/171, 173, 365/158, 189.04

(56) References Cited

U.S. PATENT DOCUMENTS

| | | | |
|---|---|---|---|
| 6,069,820 A | * | 5/2000 | Inomata et al. .............. 365/171 |
| 6,532,164 B2 | | 3/2003 | Redon et al. .................. 365/97 |
| 6,593,608 B1 | * | 7/2003 | Sharma et al. ............... 257/295 |
| 2002/0105827 A1 | | 8/2002 | Redon et al. ................. 365/173 |
| 2003/0007398 A1 | | 1/2003 | Daughton et al. .......... 365/200 |
| 2003/0059588 A1 | | 3/2003 | Hannah et al. .............. 428/200 |

OTHER PUBLICATIONS

Albert, J. F. et al, "Polarized Current Switching of a CO Thin Film Nanomagnet," American Institute of Physics, vol. 77, No. 23, Dec. 4, 2000, pp. 3809–3811.
Katine, J.A., et al., "Current–Driven Magnetization Reversal and Spin–Wave Excitations in Co/Cu/Co Pillars, " The American Physical Society, vol. 84, No. 14, Apr. 3, 2000, pp. 3149–3151.
Myers, E.G. et al., "Point–Contact Studies of Current–Controlled Domain Switching in Magnetic Multilayers," Journal of Applied Physics, vol. 87, No. 9, May 1, 2000, pp. 5502–5503.
Slonczewski, J.C., "Theory and Application of Exchange–Driven Switching," IEEE, Apr. 2000, pp. CE–02.
Slonczewski, J.C., "Current–Driven Excitation of Magnetic Multilayers," Journal of Magnetism and Magnetic Materials, 1996, pp. 1.1 –1.7.
Slonczewski, J.C., "Conductance and Exchange Coupling of Two Ferromagnets Separated by a Tunneling Barrier," The American Physical Society, vol. 39, No. 10, Apr. 1, 1999, pp. 6995–7002.
Sun, J.Z., "Current–Driven Magnetic Switching in Manganite Trilayer Juntions," Journal of Magnetism and Magnetic Materials, No. 202, 1999, pp. 157–162.

* cited by examiner

*Primary Examiner*—Anh Phung
(74) *Attorney, Agent, or Firm*—Sawyer Law Group LLP

(57) ABSTRACT

A method and system for providing a magnetic element capable of being written using spin-transfer effect while generating a high output signal and a magnetic memory using the magnetic element are disclosed. The magnetic element includes a first ferromagnetic pinned layer, a nonmagnetic spacer layer, a ferromagnetic free layer, an insulating barrier layer and a second ferromagnetic pinned layer. The pinned layer has a magnetization pinned in a first direction. The nonmagnetic spacer layer is conductive and is between the first pinned layer and the free layer. The barrier layer resides between the free layer and the second pinned layer and is an insulator having a thickness allowing electron tunneling through the barrier layer. The second pinned layer has a magnetization pinned in a second direction. The magnetic element is configured to allow the magnetization of the free layer to change direction due to spin transfer when a write current is passed through the magnetic element.

21 Claims, 6 Drawing Sheets

MAGNETIC ELEMENT UTILIZING SPIN TRANSFER AND AN MRAM DEVICE USING THE MAGNETIC ELEMENT

FIELD OF THE INVENTION

The present invention relates to magnetic memory systems, and more particularly to a method and system for providing an element that employs a spin transfer effect in switching and that can be used in a magnetic memory such as magnetic random access memory ("MRAM").

BACKGROUND OF THE INVENTION

Magnetic memories are often used in storing data. One type of memory element currently of interest utilizes magnetoresistance of a magnetic element for storing data. FIGS. 1A and 1B depict conventional magnetic elements 1 and 1'. The conventional magnetic element 1 is a spin valve 1 and includes a conventional antiferromagnetic layer 2, a conventional pinned layer 4, a conventional spacer layer 6 and a conventional free layer 8. The conventional pinned layer 4 and the conventional free layer 8 are ferromagnetic. The conventional spacer layer 6 is nonmagnetic. The conventional spacer layer 6 is conductive. The antiferromagnetic layer 2 is used to fix, or pin, the magnetization of the pinned layer 4 in a particular direction. The magnetization of the free layer 8 is free to rotate, typically in response to an external field.

The conventional magnetic element 1' is a spin tunneling junction. Portions of the conventional spin tunneling junction 1' are analogous to the conventional spin valve 1. Thus, the conventional magnetic element 1' includes an antiferromagnetic layer 2', a conventional pinned layer 4', an insulating barrier layer 6' and a free layer 8'. The conventional barrier layer 6' is thin enough for electrons to tunnel through in a conventional spin tunneling junction 1'.

Depending upon the orientations of the magnetizations of the free layer 8 or 8' and the pinned layer 4 or 4', respectively, the resistance of the conventional magnetic element 1 or 1', respectively, changes. When the magnetizations of the free layer 8 and pinned layer 4 are parallel, the resistance of the conventional spin valve 1 is low. When the magnetizations of the free layer 8 and the pinned layer 4 are antiparallel, the resistance of the conventional spin valve 1 is high. Similarly, when the magnetizations of the free layer 8' and pinned layer 4' are parallel, the resistance of the conventional spin tunneling junction 1' is low. When the magnetizations of the free layer 8' and pinned layer 4' are antiparallel, the resistance of the conventional spin tunneling junction 1' is high.

In order to sense the resistance of the conventional magnetic element 1/1', current is driven through the conventional magnetic element 1/1'. Current can be driven through the conventional magnetic element 1 in one of two configurations, current in plane ("CIP") and current perpendicular to the plane ("CPP"). However, for the conventional spin tunneling junction 1', current is driven in the CPP configuration. In the CIP configuration, current is driven parallel to the layers of the conventional spin valve 1. Thus, in the CIP configuration, current is driven from left to right or right to left as seen in FIG. 1A. In the CPP configuration, current is driven perpendicular to the layers of conventional magnetic element 1/1'. Thus, in the CPP configuration, current is driven up or down as seen in FIG. 1A or 1B. The CPP configuration is used in MRAM having a conventional spin tunneling junction 1' in a memory cell.

FIG. 2 depicts a conventional memory array 10 using conventional memory cells 20. Each conventional memory cell 20 includes a conventional magnetic element 1/1', depicted as a resistor in FIG. 2. The conventional memory array 10 typically uses a spin tunneling junction 1'. The conventional array 10 is shown as including four conventional memory cells 20. Each memory cell 20 includes a conventional spin tunneling junction 1' and a transistor 22. The memory cells 20 are coupled to reading/writing column selection 30 via bit lines 32 and 34 and to row selection 50 via word lines 52 and 54. Also depicted are write lines 60 and 62 which carry currents that generate external magnetic fields for the corresponding conventional memory cells 20 during writing. The reading/writing column selection 30 is coupled to write current source 42 and read current source 40 which are coupled to a voltage supply Vdd 48 via line 46.

In order to write to the conventional memory array 10, the write current Iw 42 is applied to the bit line 32 or 34 selected by the reading/writing column selection 30. The read current Ir 40 is not applied. Both word lines 52 and 54 are disabled. The transistors 22 in all memory cells are disabled. In addition, one of the write lines 60 and 62 selected carries a current used to write to the selected conventional memory cell 20. The combination of the current in the write line 60 or 62 and the current in the bit line 32 or 34 generates a magnetic field large enough to switch the direction of magnetization of the free layer 8' and thus write to the desired conventional memory cell 20. Depending upon the data written to the conventional memory cell 20, the conventional magnetic tunneling junction 1' will have a high resistance or a low resistance.

When reading from a conventional cell 20 in the conventional memory array 10, the read current Ir 40 is applied instead. The memory cell 20 selected to be read is determined by the row selection 50 and column selection 30. The output voltage is read at the output line 44.

Although the conventional magnetic memory 10 using the conventional spin tunneling junction 1' can function, one of ordinary skill in the art will readily recognize that there are barriers to the use of the conventional magnetic element 1' and the conventional magnetic memory 10 at higher memory cell densities. In particular, the conventional memory array 10 is written using an external magnetic field generated by currents driven through the bit line 32 or 34 and the write line 60 or 62. In other words, the magnetization of the free layer 8' is switched by the external magnetic field generated by current driven through the bit line 32 or 34 and the write line 60 or 62. The magnetic field required to switch the magnetization of the free layer 8', known as the switching field, is inversely proportional to the width of the conventional magnetic element 1'. As a result, the switching field increases for conventional memories having smaller magnetic elements 1'. Because the switching field is higher, the current required to be driven through the bit line 32 or 34 and particularly through the write line 60 or 62 increases dramatically for higher magnetic memory cell density. This large current can cause a host of problems in the conventional magnetic memory 10. For example, cross talk and power consumption would increase. In addition, the driving circuits required to drive the current that generates the switching field at the desired memory cell 20 would also increase in area and complexity. Furthermore, the conventional write currents have to be large enough to switch a magnetic memory cell but not so large that the neighboring cells are inadvertently switched. This upper limit on the write current amplitude can lead to reliability issues because the cells that are harder to switch than others (due to fabrication and material nonuniformity) will fail to write consistently.

Accordingly, what is needed is a system and method for providing a magnetic memory element which can be used in a memory array of high density, low power consumption, low cross talk, and high reliability, while providing sufficient read signal. The present invention addresses the need for such a magnetic memory element.

SUMMARY OF THE INVENTION

The present invention provides a magnetic element and a magnetic memory using the magnetic element. The magnetic element includes a first pinned layer, a nonmagnetic spacer layer, a free layer, a barrier layer and a second pinned layer. The pinned layer has a first magnetization pinned in a first direction. The nonmagnetic spacer layer is conductive and is between the first pinned layer and the free layer. The free layer has a second magnetization. The barrier layer resides between the free layer and the second pinned layer and is an insulator having a thickness that allows electrons to tunnel through the barrier layer. The second pinned layer has a third magnetization pinned in a second direction. The magnetic element is configured to allow the second magnetization of the free layer to change direction due to spin transfer when a write current is passed through the magnetic element.

According to the system and method disclosed herein, the present invention provides a magnetic element and a magnetic memory capable of being written using a more efficient and localized phenomenon while generating a high output signal.

DETAILED DESCRIPTION OF THE INVENTION

The present invention relates to an improvement in magnetic elements and magnetic memories, such as MRAM. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1A:
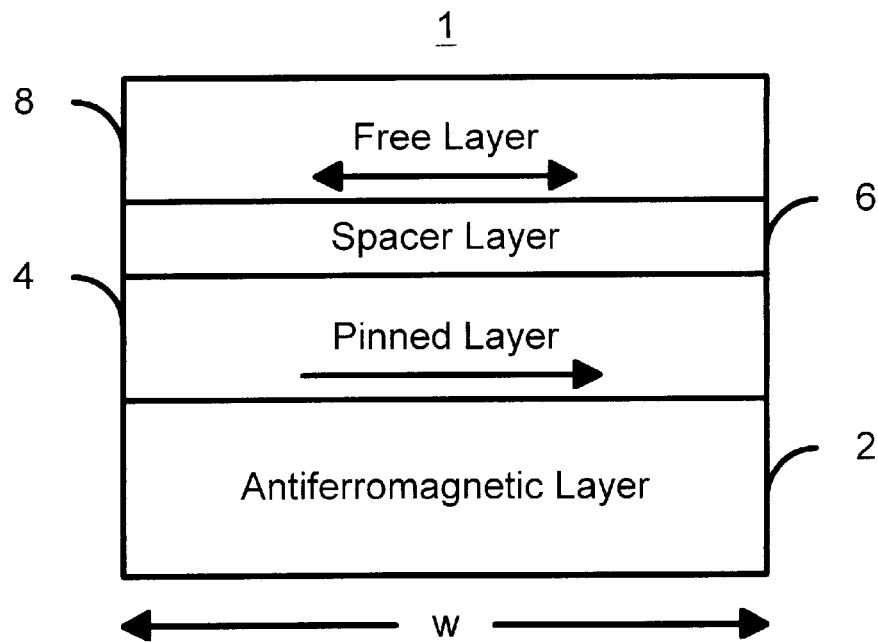
FIG. 1A is a diagram of a conventional magnetic element, a spin valve.
Figure 1B:
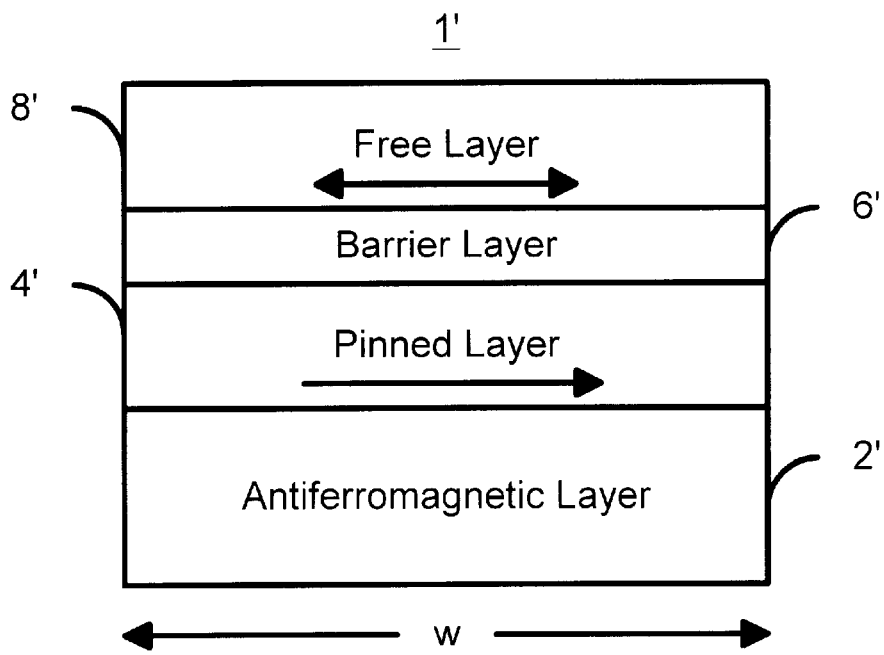
FIG. 1B is a diagram of a conventional magnetic element, a spin tunneling junction, such as an element used in a magnetic memory.
Figure 2:
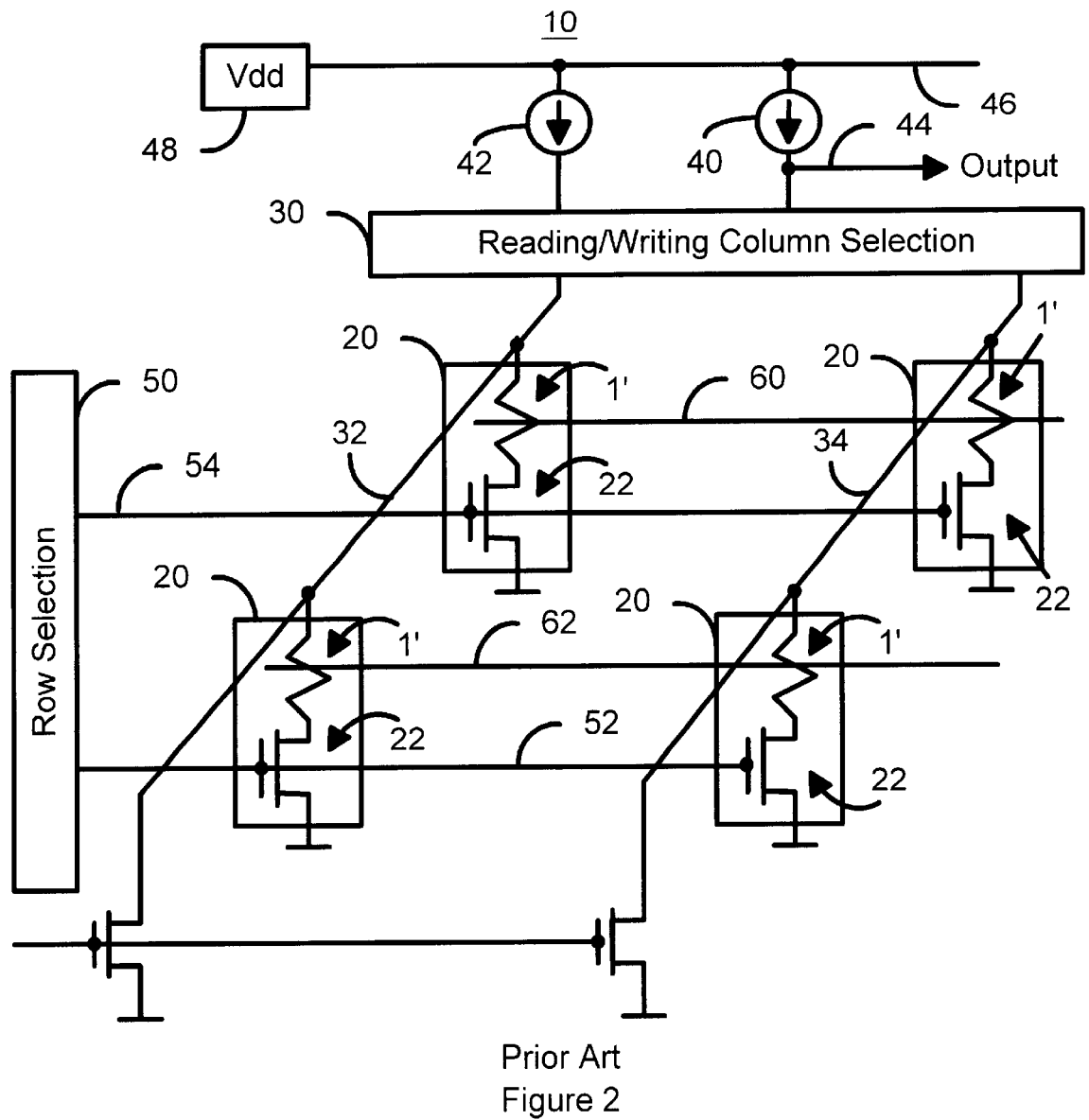
FIG. 2 is a diagram of a conventional magnetic memory array.

As described above, one of the challenges faced in increasing the density of conventional magnetic memories is the large current required to write to the conventional magnetic memories, such as the conventional magnetic memory 10 depicted in FIG. 2 and using the conventional magnetic elements 1' of FIG. 1B. In other words, the current required to generate the magnetic field that switches the direction of the magnetization of the free layer is large. This large current can be problematic because it can result in cross talk and high power consumption.

In order to overcome some of the issues associated with magnetic memories having a higher density of memory cells, a recently discovered phenomenon, spin transfer, may be utilized. Current knowledge of spin transfer is described in detail in J. C. Slonczewski, "Current-driven Excitation of Magnetic Multilayers," *Journal of Magnetism and Magnetic Materials*, vol. 159, p. L1–L5 (1996); L. Berger, "Emission of Spin Waves by a Magnetic Multilayer Traversed by a Current," *Phys. Rev. B*, Vol. 54, p. 9353 (1996), and in F. J. Albert, J. A. Katine and R. A. Buhman, "Spin-polarized Current Switching of a Co Thin Film Nanomagnet," *Appl. Phys. Lett.*, vol. 77, No. 23, p. 3809–3811 (2000). Thus, the following description of the spin transfer phenomenon is based upon current knowledge in the area and is not intended to limit the scope of the invention.

The spin-transfer effect arises from the spin-dependent electron transport properties of ferromagnetic-normal metal multilayers. When a spin-polarized current traverses a magnetic multiplayer in a CPP configuration, the spin angular momentum of electrons incident on a ferromagnetic layer interacts with magnetic moments of the ferromagnetic layer near the interface between the ferromagnetic and normal-metal layers. Through this interaction, the electrons transfer a portion of their angular momentum to the ferromagnetic layer. As a result, a spin-polarized current can switch the magnetization direction of the ferromagnetic layer if the current density is sufficiently high (approximately $10^7$–$10^8 A/cm^2$), and if the dimensions of the multilayer are small (approximately less than two hundred nanometers) so that self field effects are not important. In addition, for spin transfer to be able to switch the magnetization direction of a ferromagnetic layer, the ferromagnetic layer must be sufficiently thin, for instance, preferably less than approximately ten nanometers for Co.

The phenomenon of spin transfer can be used in the CPP configuration as an alternative to or in addition to using an external switching field to switch the direction of magnetization of the free layer 8 or 8' of the conventional spin valve 1 or the conventional spin tunneling junction 1', respectively. Spin transfer is a phenomenon which dominates other mechanisms and thus becomes observable when the dimensions of the conventional magnetic element 1/1' are small, in the range of few hundred nanometers. Consequently, spin transfer is suitable for higher density magnetic memories having smaller magnetic elements 1/1'.

For example, switching the magnetization of the conventional free layer 8 in the conventional spin valve 1 using spin transfer is described. Current can be driven from the conventional free layer 8 to the conventional pinned layer 4 to switch the magnetization of the conventional free layer 8 to be parallel to the magnetization of the conventional pinned layer 4. The magnetization of the conventional free layer 8 is assumed to be initially antiparallel to the conventional pinned layer 4. When current is driven from the conventional free layer 8 to the conventional pinned layer 4, conduction electrons travel from the conventional pinned layer 4 to the conventional free layer 8. The majority electrons traveling from the conventional pinned layer 4 have their spins polarized in the same direction as the magnetization of the conventional pinned layer 4. These electrons interact with the magnetic moments of the conventional free layer 8 near the interface between the conventional free layer 8 and the conventional spacer layer 6. As a result of this interaction, the electrons transfer their spin angular momentum to the conventional free layer 8. Thus, angular momentum corresponding to spins antiparallel to the magnetization of the conventional free layer 8 (and parallel to the conventional pinned layer 4) is transferred to the conventional free layer. If sufficient angular momentum is transferred by the electrons, the magnetization of the conventional free layer 8 can be switched to be parallel to the magnetization of the conventional free layer 4.

Alternatively, current can be driven from the conventional pinned layer 4 to the conventional free layer 8 to switch the magnetization of the conventional free layer 8 to be antiparallel to the magnetization of the conventional pinned layer 8. In this case the magnetization of the free layer 8 is assumed to be initially parallel to the pinned layer 4. When current is driven from the conventional pinned layer 4 to the conventional free layer 8, conduction electrons travel in the opposite direction. The majority electrons have their spins polarized in the direction of magnetization of the conventional free layer 8, which is originally magnetized in the same direction as the conventional pinned layer 4. These majority electrons are transmitted through the conventional pinned layer 4. However, the minority electrons, which have spins polarized antiparallel to the magnetization of the conventional free layer 8 and the conventional pinned layer 4, will be reflected from the conventional pinned layer 4 and travel back to the conventional free layer 8. The minority electrons reflected by the conventional pinned layer 4 interact with magnetic moments of the conventional free layer 8 and transfer at least a portion of their spin angular momentum to the conventional free layer 8. If sufficient angular momentum is transferred by the electrons to the conventional free layer 8, the magnetization of the free layer 8 can be switched to be antiparallel to the magnetization of the conventional pinned layer 4.

Using a current driven through the conventional magnetic elements 1 or 1' in the CPP configuration, spin transfer can switch the direction of magnetization of the free layer 8 or 8', respectively. Thus, spin transfer can be used to write to magnetic elements 1 or 1' in a magnetic memory by using a current through the conventional magnetic element 1 or 1'. The mechanism of spin-transfer writing is, therefore, more localized and generates less cross talk. Spin transfer is also more reliable because spin transfer results in a high effective field in the conventional magnetic elements 1/1' in a device such as MRAM. In addition, for a to magnetic element 1 or 1' having a small enough size, the current required to switch the magnetization can be significantly less than the current required to generate a switching field in the conventional magnetic memory 10. Thus, there is less power consumption in writing.

Although the phenomenon of spin transfer can be used to switch the direction of the magnetization of the conventional free layer 8/8', one of ordinary skill in the art will readily recognize that there are additional barriers to using the conventional magnetic element 1/1' in a memory. For the conventional spin valve 1, the CPP configuration results in a significantly reduced signal. For example, the magnetoresistance ratio for the CPP configuration of the conventional spin valve 1 is only approximately two percent. In addition, the total resistance of the conventional spin valve 1 is low.

Thus, the read signal output by the conventional spin valve 1 is very low. Although spin transfer can be used to write to a conventional spin valve 1, the output signal when reading from the conventional spin valve 1 is low enough to make it difficult to use the conventional spin valve 1 in a magnetic memory that is written using spin transfer.

On the other hand, a conventional spin tunneling junction 1' typically has a large resistance-area product, with $Ra \sim k\Omega\mu m^2$. A high current density is required to induce the spin-transfer effect could destroy thin insulating barrier due to ohmic dissipation. Moreover, the spin transfer has not been observed in the conventional spin tunneling junction 1' at room temperature. The conventional spin tunneling junction 1' having high Ra values may, therefore, not be able to be used in MRAM using spin transfer to write to the magnetic memory cells. Consequently, one of ordinary skill in the art would recognize that a reliable, localized mechanism for writing to magnetic memories having higher densities and smaller magnetic elements is still desired.

The present invention provides a magnetic element and a magnetic memory using the magnetic element. The magnetic element includes a first pinned layer, a nonmagnetic spacer layer, a free layer, a barrier layer and a second pinned layer. The first and second pinned layers as well as the free layer are ferromagnetic. The pinned layer has a first magnetization pinned in a first direction. The nonmagnetic spacer layer is conductive and is between the first pinned layer and the free layer. The free layer has a second magnetization. The barrier layer resides between the free layer and the second pinned layer and is an insulator having a thickness that allows tunneling through the barrier layer. The second pinned layer has a third magnetization pinned in a second direction. The magnetic element is configured to allow the second magnetization of the free layer to change direction due to spin transfer when a write current is passed through the magnetic element.

The present invention will be described in terms of a particular magnetic memory and a particular magnetic element having certain components. However, one of ordinary skill in the art will readily recognize that this method and system will operate effectively for other magnetic memory elements having different and/or additional components and other magnetic memories having different and/or other features not inconsistent with the present invention. The present invention is also described in the context of current understanding of the spin transfer phenomenon. Consequently, one of ordinary skill in the art will readily recognize that theoretical explanations of the behavior of the method and system are made based upon this current understanding of spin transfer. One of ordinary skill in the art will also readily recognize that the method and system are described in the context of a structure having a particular relationship to the substrate. However, one of ordinary skill in the art will readily recognize that the method and system are consistent with other structures. For example, the present invention is described in terms of a bottom spin valve (having a pinned layer at the bottom of the spin valve) combined with a top spin tunneling junction (having a pinned layer at the top of the spin tunneling junction). The present invention is also consistent with a top spin valve and a bottom spin tunneling junction. In addition, the method and system are described in the context of certain layers being synthetic. However, one of ordinary skill in the art will readily recognize that other and/or additional layers could be synthetic.

Figure 3:
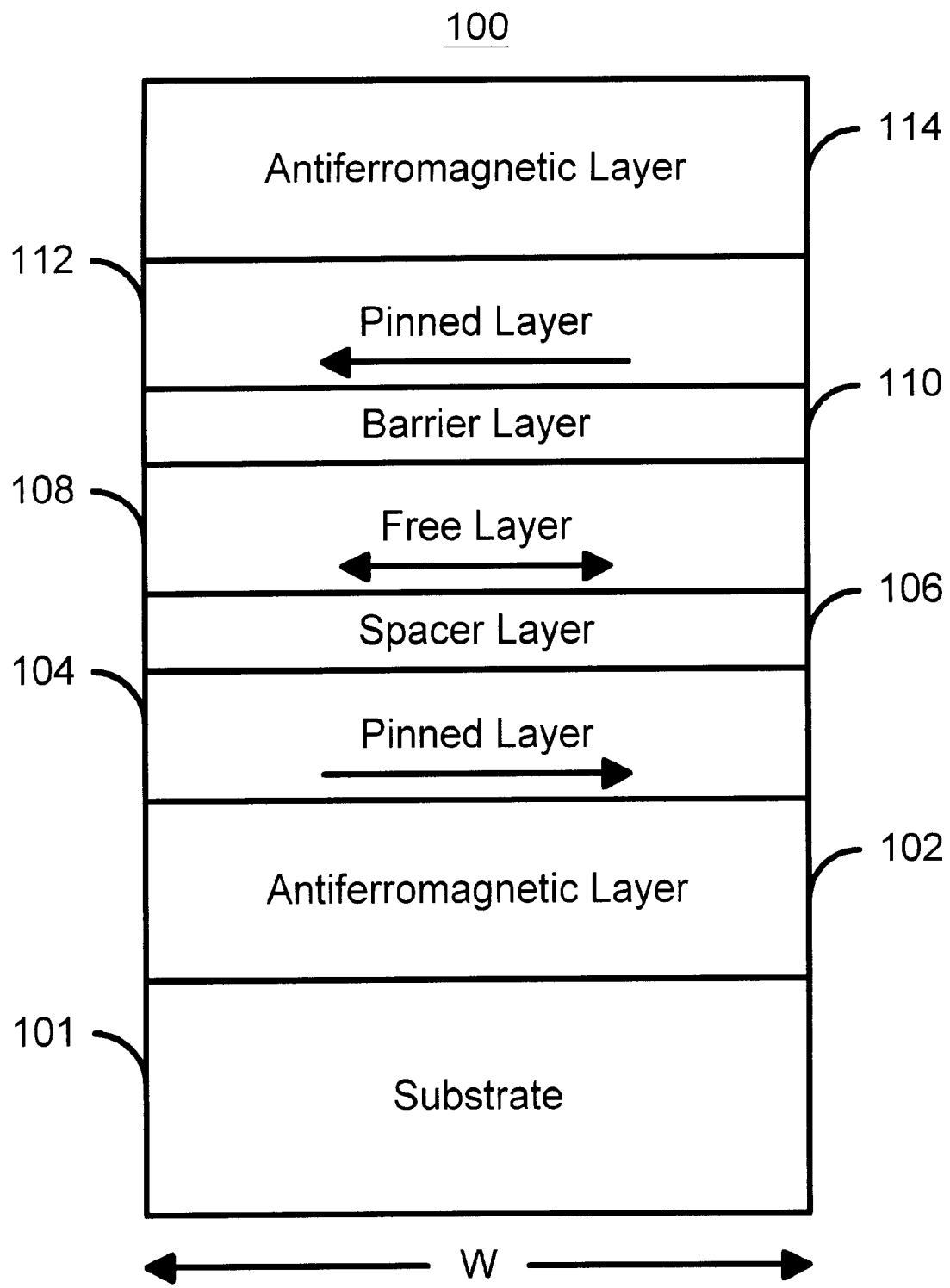
FIG. 3 is a diagram depicting one embodiment of a magnetic element in accordance with the present invention.

To more particularly illustrate the method and system in accordance with the present invention, refer now to FIG. 3, which depicts one embodiment of a magnetic element 100 in accordance with the present invention. Note that other layers, such as seed or capping layers, are not depicted for clarity. The magnetic element 100 is formed on a substrate 101. The magnetic element 100 includes a first antiferromagnetic layer 102, a first pinned layer 104, a conductive spacer layer 106, a free layer 108, an insulating barrier layer 110, a second pinned layer 112 and a second antiferromagnetic layer 114. Note that the first pinned layer 104, the free layer 108 and the second pinned layer 112 are depicted as single constituent ferromagnetic layers. However, one of ordinary skill in the art will readily recognize that any portion of the layers 104, 108 and 112 can be synthetic. The magnetic element 100 can be considered to be a combination of a spin valve and a spin tunneling junction. The spin valve would be considered to include the first antiferromagnetic layer 102, the first pinned layer 104, the conductive spacer layer 106, and the free layer 108. The spin tunneling junction would be considered to include the free layer 108, the insulating barrier layer 110, the second pinned layer 112 and the second antiferromagnetic layer 114. In the preferred embodiment, the spin valve portion of the magnetic element 100 writes to the free layer 108 using spin transfer, while the spin tunneling portion of the magnetic element 100 is used to read the magnetic element 100.

The magnetic element 100 is configured to allow the magnetization of the free layer 108 to be switched using spin transfer. Consequently, the dimensions of the magnetic element 100 are small, in the range of few hundred nanometers. In a preferred embodiment, the dimensions of the magnetic element 100 are less than two hundred nanometers and preferably approximately one hundred nanometers. The magnetic element 100 preferably has a depth, perpendicular to the plane of the page in FIG. 3, of approximately fifty nanometers. The depth is preferably smaller than the width of the magnetic element 100 so that the magnetic element 100 has some shape anisotropy, ensuring that the free layer 108 has a preferred direction. In addition, the thickness of the free layer 108 is low enough so that the spin transfer is strong enough to rotate the free layer magnetization into alignment with the magnetizations of the pinned layers 104 and 112. In a preferred embodiment, the free layer 108 has a thickness of less than or equal to 10 nm.

The pinned layers 104 and 112 and free layer 108 are ferromagnetic. The pinned layers 104 and 112 as well as the free layer 108 preferably include Co, Fe, Ni and their alloys. Also in a preferred embodiment, the thicknesses of the ferromagnetic layer 104, 108 and 112 are selected to balance the interaction and demagnetization fields of the ferromagnetic layers so that the free layer 108 does not experience a strong net bias. In other words, the total of the magnetostatic field and the interlayer and static coupling fields preferably sum to zero to reduce the bias on the free layer 108. Moreover, as discussed above, the magnetic element preferably has some shape anisotropy so that the free layer 108 has a preferred direction. In addition, a seed layer (not shown), such as Ta or NiFeCr is preferably provided under the antiferromagnetic layer 10 to ensure that the antiferromagnetic layer 102 has the desired structure and properties. The conductive spacer layer 106 is preferably Cu or other nonmagnetic transition metal. The barrier layer 110 is thin enough to allow the tunneling of electrons through the barrier layer 110 and is preferably composed of alumina. In alternate embodiments, the barrier layer 110 may include other dielectric materials including, but not limited to, AlN, $Ta_2O_5$, $SiO_2$, $HfO_2$, $ZrO_2$, MgO, $MgF_2$ and $CaF_2$.

The magnetizations of the first pinned layer 104 and the second pinned layer 112 are depicted as being pinned in opposite directions. In an alternate embodiment, the magnetizations of the pinned layers 104 and 112 may be pinned in the same direction. For example, if a synthetic free layer is used, the pinned layers 104 and 112 are preferably pinned in the same direction. However, in an embodiment which may not function as well as the preferred embodiment, the pinned layers 104 and 112 may still be pinned in the same direction when a simple free layer is used. Thus, in a preferred embodiment, the pinned layers 104 and 112 adjacent to the spacer layer 106 and the barrier layer 110, respectively, are desired to be aligned in opposite directions. This orientation is desired so that if the spin tunneling junction portion of the magnetic element 100 can be made to contribute to spin transfer, as described below, then the magnetic element can be written as desired by using a smaller current density.

The antiferromagnetic layers 102 and 114 are used to pin the magnetizations of the pinned layers 104 and 112, respectively. The antiferromagnetic layers 102 and 114 are preferably composed of PtMn. However, nothing prevents the antiferromagnetic layers 102 and 114 from including other antiferromagnetic materials, such as NiMn, PdMn and IrMn. PtMn is preferred for use in the anti ferromagnetic layers 102 and 114 because PtMn has a high blocking temperature and a high exchange biasing field, which improve the thermal stability of the magnetic element 100. In such an embodiment, the orientation of the antiferromagnetic layers can be set by annealing the magnetic element 100 in a field of at least five thousand Oersted at approximately two hundred and seventy degrees Celsius for between three and ten hours. Antiferromagnetic layers 102 and 114 having different blocking temperatures are preferably used when the pinned layers 104 and 112 are to be pinned in different directions. When the antiferromagnetic layer 102 has a higher blocking temperature than the anti ferromagnetic layer 114, the orientation of the antiferromagnetic layer 114 can be set independently from the antiferromagnetic layer 102 by annealing the magnetic element 100 at the blocking temperature of the antiferromagnetic layer 114. As a result, the magnetizations of the pinned layers 102 and 114 can be pinned in different directions.

In operation, the magnetic element 100 is written by using spin transfer. Currently, the spin transfer phenomenon is predominantly provided using the spin valve portion of the magnetic element 100. In particular, a current can be driven from the second pinned layer 112 through the free layer 108 and the first pinned layer 104. Such a current corresponds to electrons spin polarized in the direction of magnetization of the first pinned layer 104 and can thus set the magnetization of the free layer 108 in the same direction as the first pinned layer 104. Similarly, when is current driven in the opposite direction, minority electrons reflecting off of the first pinned layer 104 and returning to the free layer 108 can switch the magnetization of the free layer 108 to be opposite to the magnetization of the pinned layer 104.

Consequently, spin transfer can be used to write to magnetic element 100. As a result, a switching field driven by an external current is unnecessary. Instead, a more localized and reliable phenomenon is used to write to the magnetic element 100. In addition, for a magnetic element 100 having the preferred dimensions, a sufficient current density on the order of $10^7$ Amps/$cm^2$ can be provided at a relatively small current. For example, a current density of approximately $10^7$ Amps/$cm^2$ can be provided with a current of approximately 0.5 mA for a magnetic element having an ellipsoidal shape of 0.06×0.12 $\mu m^2$. As a result, the use special circuitry for delivering very high currents may be avoided.

Additional advances in spin tunneling junctions with low Ra of few $\Omega\mu m^2$ may allow the spin tunneling junction portion (108, 110, 112 and 114) of the magnetic element 100 to contribute to the spin transfer because the electron spin is conserved during tunneling. Consequently, in a preferred embodiment, the magnetizations of the pinned layers 104 and 112 are in opposite directions so that the spin tunneling junction portion of the magnetic element 100 has an opportunity to appropriately contribute to the spin transfer. In such an embodiment, the spin transfer due to conduction electrons traveling from the pinned layer 104 to the free layer 108 and conduction electrons reflected off the pinned layer 112 and returning to the free layer 108 would work together to align the magnetization of the free layer 108 in the direction of magnetization of the pinned layer 104. Similarly, spin transfer due to conduction electrons traveling from the pinned layer 112 to the free layer 108 and conduction electrons reflected off the pinned layer 104 and returning to the free layer 108 would work together to align the magnetization of the free layer 108 in the direction of magnetization of the pinned layer 112. Because the magnetizations of the pinned layers 104 and 112 are pinned in opposite directions, in such an embodiment using advances in spin tunneling junctions would improve the ability of the magnetic element 100 to be written using spin transfer. In such an embodiment, the current required to switch the direction of magnetization of the free layer 108 may be further reduced, for example by a factor of two.

During reading, the properties of the spin tunneling junction portion of the magnetic element 100 are preferably exploited. Because of the existence of the insulating barrier 110 and the second pinned layer 112, the spin tunneling portion of the magnetic element 100 dominates the output signal. In other words, although writing to the magnetic element 100 sets the magnetization of the free layer 108 with respect to the first pinned layer 104, the magnetization of the free layer 108 with respect to the second pinned layer 110 dominates the output signal of the magnetic element, both in total resistance and in magnetoresistance changes. Thus, during reading, the state of the free layer 108 with respect to the second pinned layer 112 (antiparallel or parallel to the second pinned layer 112) determines the output of the magnetic element 100. When the free layer 108 is parallel to the second pinned layer 112, the resistance of the magnetic element 100 is low. When the free layer 108 is antiparallel to the second pinned layer 112, the resistance of the magnetic element 100 is high. Ra for the magnetic element 100 is preferably on the order of few $\Omega\mu m^2$ As a result, a higher current density, on the order of 10Amps/cm$^2$, can be provided without destroying the magnetic element 100. Moreover, because the magnetoresistance due to the spin tunneling junction portion of the magnetic element 100 is much larger than (preferably at least twenty times) that from spin-valve portion in the CPP configuration, the magnetic element 100 provides a sufficient signal at lower current densities in the CPP configuration.

The magnetic element 100 can thus be written to and read from using a current driven through the magnetic element 100. The read current driven through the magnetic element 100 is less than the current driven through the magnetic element 100 during writing. The read current is less than the write current in order to ensure that the direction of magnetization of the free layer 108 magnetic element 100 is not inadvertently switched to during reading. In a preferred embodiment, the read current is an order of magnitude less than the write current.

Thus, the magnetic element 100 can be written by exploiting the spin-transfer phenomenon. Because spin transfer is used, an external current producing an external switching magnetic field is no longer needed to write to the free layer 108 of the magnetic element 100. Instead, a current driven through the magnetic element 100 is used. As a result, there is less cross talk because a more localized switching mechanism is utilized, and less power consumed. In addition, spin transfer has been found to be a more reliable switching mechanism than an external switching field. Spin transfer generates a very high effective field and can thus switch a greater percentage of magnetic elements 100 in a memory. Furthermore, for a magnetic element having the preferred size, the current required to write to the magnetic element 100 may be reduced. The magnetic element 100 also has a significantly higher output signal when being read in a CPP configuration than a conventional spin valve because of the presence of the spin tunneling junction portions (layers 108, 110, 112 and 114) of the magnetic element 100. Consequently, the magnetic element 100 is suitable for use as a storage element in a higher density magnetic memory such as MRAM.

Figure 4:
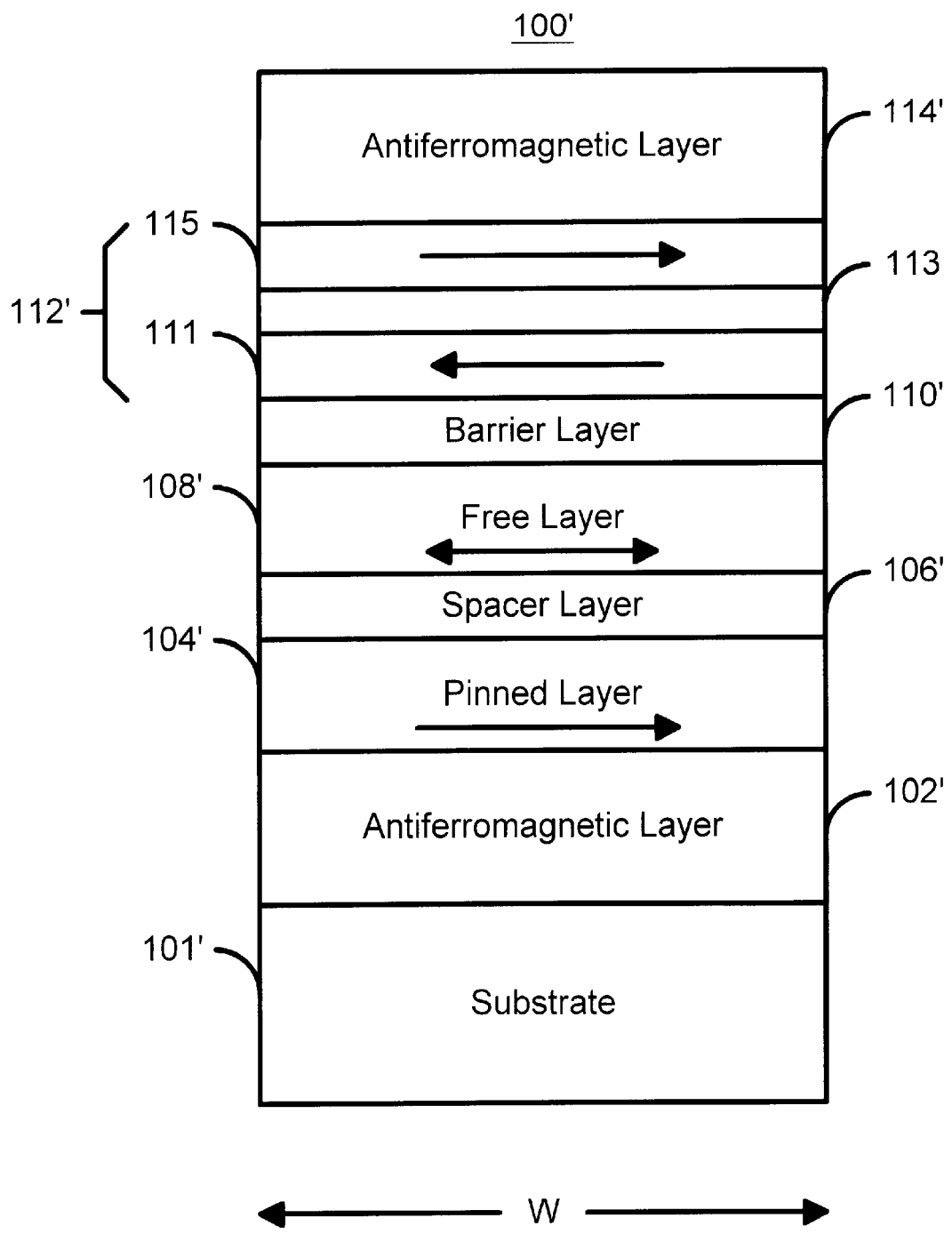
FIG. 4 is a diagram depicting another, preferred embodiment of a magnetic element in accordance with the present invention.

FIG. 4 is a diagram depicting another, preferred embodiment of a magnetic element 100' in accordance with the present invention. The magnetic element 100' has many of the same components as the magnetic element 100 depicted in FIG. 3. Consequently, analogous structures are labeled similarly for the magnetic element 100' depicted in FIG. 4. In addition, these components are preferably fabricated in an analogous manner and made from similar materials as analogous components in the magnetic element 100. However, the second pinned layer 112' of the magnetic element 100' is a synthetic pinned layer 112'. Thus, the synthetic pinned layer 112' includes ferromagnetic layers 111 and 115 separated by a nonmagnetic conductive spacer layer 113. The magnetic layers 111 and 115 preferably include Co, Fe, Ni and their ferromagnetic alloys, such as NiFe, CoFe or CoNiFe. In addition, the above materials containing some B impurities may also be used for the magnetic layers 111 and 115. The B impurities give the materials greater thermal stability. In alternate embodiments, the layers 111 and 115 may be made of other magnetic materials such as half metallic ferromagnets including $CrO_2$, NiMnSb and PtMnSb. The nonmagnetic spacer layer 113 preferably includes materials such as Ru, Ir and Re. The thickness of the nonmagnetic spacer layer is such that the ferromagnetic layers 111 and 115 are antiferromagnetically coupled.

The synthetic pinned layer 112' is preferred to simplify the annealing process which sets the pinning directions of the magnetizations of the second pinned layer 112' and the first pinned layer 104'. In particular, use of the synthetic pinned layer 112' allows the antiferromagnetic layers 102' and 114' to be made from the same material, preferably PtMn, and aligned in the same direction. The antiferromagnetic layers 102' and 114' may thus be aligned together in the same step. Consequently, the magnetizations of the first pinned layer 104' and the ferromagnetic layer 115 are pinned in the same direction. The magnetization of the ferromagnetic layer 111 is in the opposite direction as the magnetization of the ferromagnetic layer 115 and the pinned layer 104'. As a result, the desired directions of the magnetizations of the ferromagnetic layers 104' and 111 adjacent to the spacer layer 106' and barrier layer 110', respectively, are more easily established.

Thus, the magnetic element 100' can also be written by exploiting the spin-transfer phenomenon. Because spin transfer is used, an external current producing an external switching magnetic field is no longer needed to write to the free layer 108' of the magnetic element 100'. As a result, the mechanism used in switching the magnetization of the free layer 108' is more localized. In addition, spin transfer can switch a greater percentage of the magnetic memory elements and is thus more reliable. Further, for a magnetic element 100' having the preferred size, the current required to write to the magnetic element 100' may be greatly reduced over the current used in writing to the conventional magnetic element 1' in a higher density memory. In addition, setting the pinning directions of the magnetic element 100' is simplified due to the presence of the synthetic pinned layer 112', which allows the use of the same antiferromagnetic materials such as PtMn for both pinned layers 104' and 112'. The use of PtMn antiferromagnetic materials greatly improves the thermal stability of the magnetic element 100'. Furthermore, the magnetic element 100 also has a significantly higher output signal when being read in a CPP configuration than a conventional spin valve because of the presence of the spin tunneling junction portion (layers 108', 110', 112' and 114') of the magnetic element 100'. Consequently, the magnetic element 100' is suitable for use as a storage element in a higher density magnetic memory such as MRAM.

Figure 5:
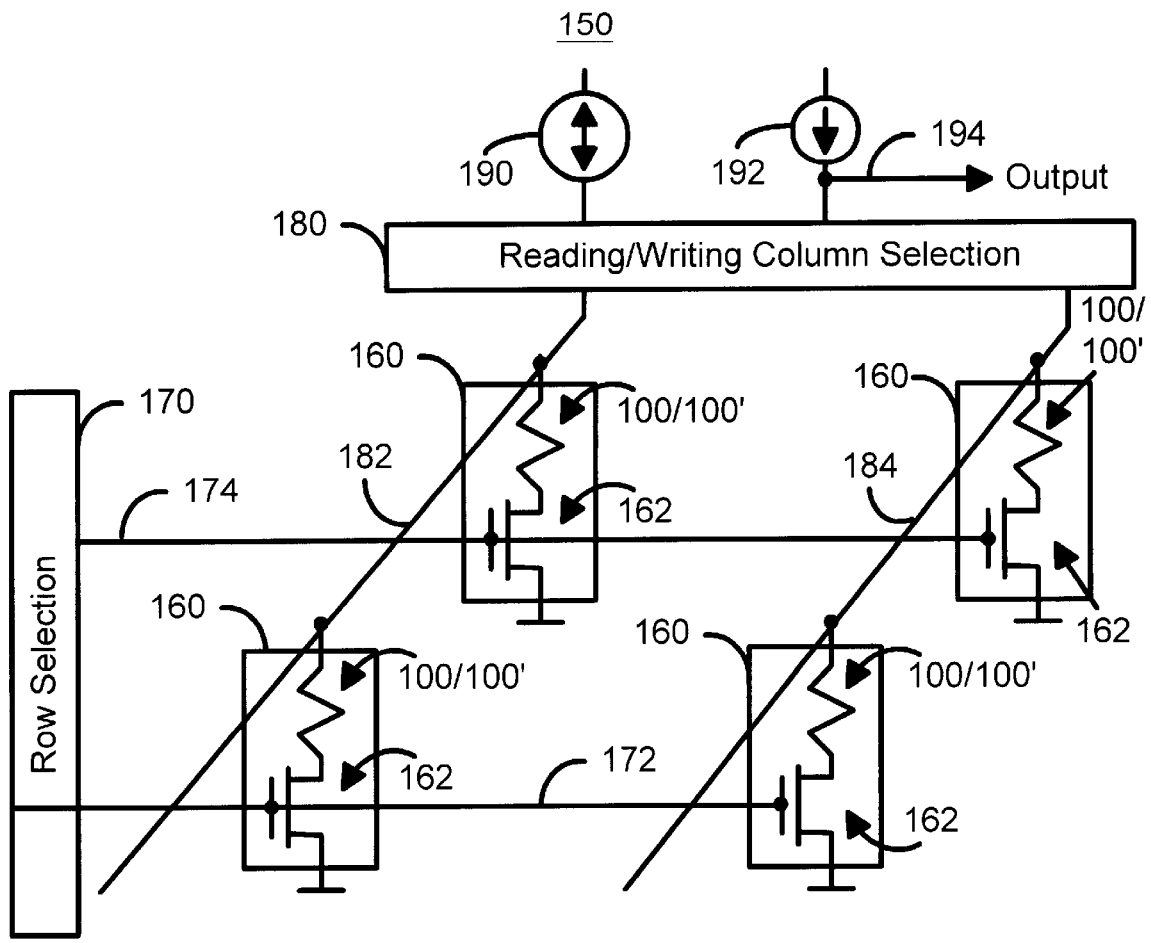
FIG. 5 is a diagram depicting one embodiment of a magnetic memory in accordance with the present invention using the magnetic element in accordance with the present invention.

FIG. 5 is a diagram depicting one embodiment of a magnetic memory array 150 in accordance with the present invention using the magnetic element 100 or 100' in accordance with the present invention. The magnetic memory array 150 is for exemplary purposes only and thus depicts a memory array 150 in which the magnetic elements 100 or 100' may be more directly incorporated into a conventional memory. Thus, each memory cell 160 includes a magnetic element 100 or 100' and a transistor 162. The magnetic memory array 150 also includes row selection mechanism 170, column selection mechanism 180, word lines 172 and 174, and bit lines 182 and 184. The magnetic memory array 150 further includes write current source 190 and read current source 192. However, the magnetic memory array 150 does not include any write lines.

Because spin transfer is used to write to the magnetic elements 100 and 100', additional lines, such as write lines 60 and 62 of the conventional memory 10, depicted in FIG. 2, are unnecessary. Consequently, the density of the magnetic memory 150 may be further increased without high power consumption and other issues due to the use of the conventional write operation to write the conventional memory elements 1 and 1'. In addition, the circuitry used to write to the magnetic elements 100/100' can be simplified because of the omission of separate write lines.

Figure 6:
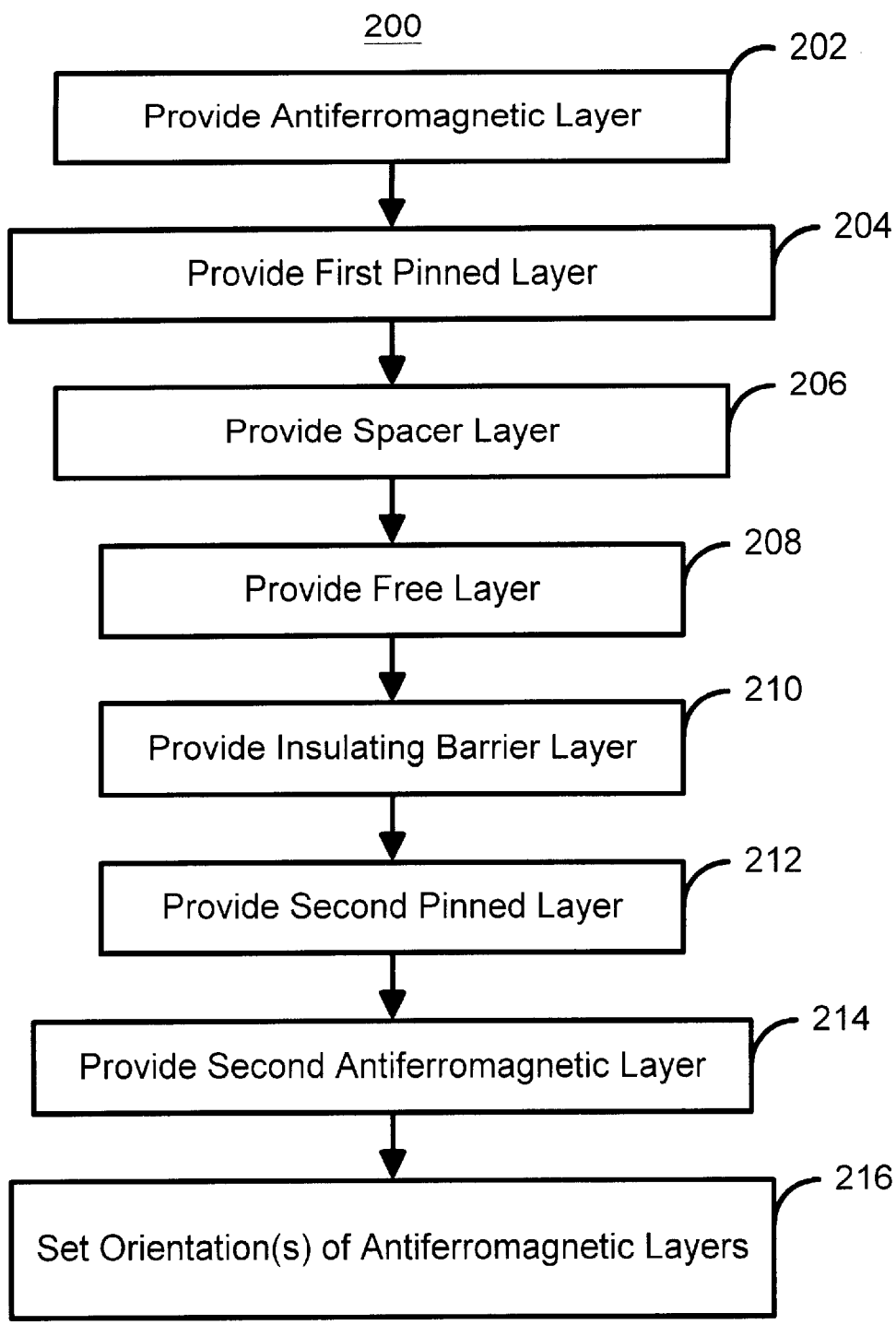
FIG. 6 is a high-level flow chart depicting one embodiment of a method in accordance with the present invention for providing a magnetic element in accordance with the present invention.

FIG. 6 is a high-level flow chart depicting one embodiment of a method 200 in accordance with the present invention for providing a magnetic element in accordance with the present invention. For clarity, the method 200 is described in the context of the magnetic element 100. However, the method 200 could be adapted to other magnetic elements. The antiferromagnetic layer 102 is provided, via step 202. In a preferred embodiment, the antiferromagnetic layer 102 is provided on the appropriate seed layer. The first pinned layer 104 and the conductive spacer 106 are provided in steps 204 and 206, respectively. Step 204 could also include providing a synthetic pinned layer. The free layer 108 and barrier layer 110 are provided in steps 208 and 210, respectively. Step 208 could include providing a synthetic free layer. The second pinned layer 112 and second antiferromagnetic layer 114 are provided, via steps 212 and 214, respectively. The orientation(s) of the antiferromagnetic layers 114 and 102 are set, via step 216. Step 216 could include independently setting the orientations of the antiferromagnetic layers 102 and 114 if the pinned layers 104 and 112 are to be pinned in different directions. Similarly, step 216 could set the orientations of the antiferromagnetic layers 102 and 114 together. The magnetic element 100 may then be defined and other processing completed. Thus, using the method 200, the magnetic elements 100 and/or 100' may be fabricated.

A method and system has been disclosed for providing a magnetic element that can be written using spin transfer, and thus a smaller and localized switching current, and which provides an adequate read signal. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetic element comprising:
   a first pinned layer, the pinned layer being ferromagnetic and having a first magnetization, the first magnetization being pinned in a first direction;
   a nonmagnetic spacer layer, the nonmagnetic spacer layer being conductive;
   a free layer, the first nonmagnetic spacer layer residing between the first pinned layer and the free layer, the free layer being ferromagnetic and having a second magnetization;
   a barrier layer, the barrier layer being an insulator and having a thickness that allows tunneling through the barrier layer;
   a second pinned layer, the second pinned layer being ferromagnetic and having a third magnetization pinned in a second direction, the barrier layer being between the free layer and the second pinned layer;
   wherein the magnetic element is configured to allow the second magnetization of the free layer to change direction due to spin transfer when a write current is passed through the magnetic element.

2. The magnetic element of claim 1 wherein the first direction is opposite to the second direction.

3. The magnetic element of claim 1 further comprising:
   a first antiferromagnetic layer adjacent to the first pinned layer, the first antiferromagnetic layer for pinning the first magnetization of the first pinned layer; and
   a second antiferromagnetic layer adjacent to the second pinned layer, the second antiferromagnetic layer for pinning the third magnetization of the second pinned layer.

4. The magnetic element of claim 3 wherein the first antiferromagnetic layer and the second antiferromagnetic layer include PtMn.

5. The magnetic element of claim 3 wherein the first antiferromagnetic layer has a first blocking temperature, the second antiferromagnetic layer has a second blocking temperature, the second blocking temperature being different from the first blocking temperature.

6. The magnetic element of claim 1 wherein the first pinned layer is a synthetic pinned layer.

7. The magnetic element of claim 1 wherein the second pinned layer is a synthetic pinned layer.

8. The magnetic element of claim 1 wherein the magnetic element has a width of less than or equal to 200 nm.

9. The magnetic element of claim 8 wherein the magnetic element has a width of approximately 100 nm.

10. The magnetic element of claim 9 wherein the magnetic element has a depth of approximately 50 nm.

11. A magnetic memory device comprising:

a plurality of magnetic cells including a plurality of magnetic elements, each of the plurality of magnetic elements including a first pinned layer, a nonmagnetic spacer layer, a free layer, a barrier layer, and a second pinned layer, the first pinned layer being ferromagnetic and having a first magnetization, the first magnetization being pinned in a first direction, the nonmagnetic spacer layer being conductive and residing between the first pinned layer and the free layer, the free layer being ferromagnetic and having a second magnetization, the barrier layer being an insulator and having a thickness that allows tunneling through the barrier layer, the second pinned layer being ferromagnetic and having a third magnetization pinned in a second direction, the barrier layer being between the free layer and the second pinned layer, each of the plurality of magnetic elements being configured such that the second magnetization of the free layer can change direction due to spin transfer when a write current is passed through the magnetic element;

a plurality of row lines coupled to the plurality of magnetic cells; and a plurality of column lines coupled with the plurality of cells, the plurality of row lines and the plurality of column lines for selecting a portion of the plurality of magnetic cells for reading and writing.

12. The magnetic memory device of claim 11 wherein the magnetic memory is configured to write to the portion of the plurality of magnetic cells without requiring the use of additional lines.

13. The magnetic memory device of claim 11 wherein the first direction of the first magnetization of the first pinned layer is opposite to the second direction of the third magnetization of the second pinned layer.

14. The magnetic memory device of claim 11 wherein each of the plurality of magnetic elements further include:

a first antiferromagnetic layer adjacent to the first pinned layer, the first antiferromagnetic layer for pinning the first magnetization of the first pinned layer; and a second antiferromagnetic layer adjacent to the second pinned layer, the second antiferromagnetic layer for pinning the third magnetization of the second pinned layer.

15. The magnetic memory device of claim 14 wherein the first antiferromagnetic layer and the second antiferromagnetic layer include PtMn.

16. The magnetic memory device of claim 14 wherein the first antiferromagnetic layer has a first blocking temperature, the second antiferromagnetic layer has a second blocking temperature, the second blocking temperature being different from the first blocking temperature.

17. The magnetic memory device of claim 11 wherein the first pinned layer is a synthetic pinned layer.

18. The magnetic memory device of claim 11 wherein the second pinned layer is a synthetic pinned layer.

19. The magnetic memory device of claim 11 wherein each of the plurality of magnetic elements has a width of less than or equal to 200 nm.

20. The magnetic memory device of claim 19 wherein each of the plurality of magnetic elements has a width of approximately 100 nm.

21. The magnetic memory device of claim 20 wherein the magnetic element has a depth of approximately 50 nm.

\* \* \* \* \*